US012774775B2

(12) United States Patent
Howell et al.

(10) Patent No.: US 12,774,775 B2
(45) Date of Patent: Oct. 27, 2026

(54) PAN AND TILT HEAD

(71) Applicant: PGA TOUR Enterprises, LLC, Ponte Vedra Beach, FL (US)

(72) Inventors: Jeff Howell, Ponte Vedra Beach, FL (US); Jonas Henrik Gredenhag, Ponte Vedra Beach, FL (US)

(73) Assignee: PGA TOUR Enterprises, LLC, Ponte Vedra Beach, FL (US)

( * ) Notice: Subject to any disclaimer, the term of this patent is extended or adjusted under 35 U.S.C. 154(b) by 0 days.

(21) Appl. No.: 19/400,007

(22) Filed: Nov. 25, 2025

(65) Prior Publication Data

US 2026/0078863 A1 Mar. 19, 2026

Related U.S. Application Data

(63) Continuation of application No. 18/987,874, filed on Dec. 19, 2024, now Pat. No. 12,510,206.

(60) Provisional application No. 63/615,939, filed on Dec. 29, 2023.

(51) Int. Cl.
*F16M 11/12* (2006.01)
*F16M 11/18* (2006.01)

(52) U.S. Cl.
CPC ........... *F16M 11/126* (2013.01); *F16M 11/18* (2013.01); *F16M 2200/024* (2013.01)

(58) Field of Classification Search
CPC . F16M 11/126; F16M 11/18; F16M 2200/024
USPC .................................................. 248/133, 371
See application file for complete search history.

(56) References Cited

U.S. PATENT DOCUMENTS

| | | | | |
|---|---|---|---|---|
| 7,899,320 B2 * | 3/2011 | Lindsay | H02J 7/751 | 396/428 |
| 8,348,214 B2 * | 1/2013 | Vogt | F16M 11/041 | 396/428 |
| 10,422,469 B2 * | 9/2019 | Clark | F16M 11/14 | |
| 10,612,718 B2 * | 4/2020 | Johnson, Sr. | F16M 11/041 | |
| 10,626,912 B2 * | 4/2020 | Karai | F16M 11/2078 | |
| 11,085,736 B2 * | 8/2021 | Johnson, Sr. | F41G 11/003 | |
| 12,085,219 B1 * | 9/2024 | Barrientos Juárez | F16M 13/022 | |
| 12,287,177 B2 * | 4/2025 | Johnson, Sr. | F41G 11/003 | |
| 2010/0018101 A1 * | 1/2010 | Moody | F41A 23/10 | 42/72 |
| 2010/0113173 A1 | 5/2010 | Rushe | | |
| 2010/0181454 A1 * | 7/2010 | Vogt | F16M 11/041 | 248/309.1 |
| 2013/0108255 A1 * | 5/2013 | Vogt | F16M 11/041 | 396/428 |

(Continued)

OTHER PUBLICATIONS

Notice of Acceptance issued Jul. 16, 2026 in connection with corresponding Australian Patent Application No. 2024415538.

*Primary Examiner* — Muhammad Ijaz
(74) *Attorney, Agent, or Firm* — Blank Rome LLP

(57) ABSTRACT

A head for mounting a device for tracking objects on a golf course during a golf tournament may include a control system that controls delivery of a supply of power to one or more of a tilt motor operable to drive tilt movement of a top plate of the head about a tilt axis or a pan motor operable to drive pan movement of the top plate. The control system may include one or both of a tilt stop mechanism or a pan stop mechanism configured to limit the respective tilt movement or pan movement. A quick mounting surface for mounting a sensor device to the head may be provided on the top plate.

15 Claims, 10 Drawing Sheets

(56) References Cited

U.S. PATENT DOCUMENTS

| | | | | |
|---|---|---|---|---|
| 2014/0373329 | A1* | 12/2014 | Volfson | F16M 13/02 248/221.11 |
| 2019/0145731 | A1* | 5/2019 | Stewart | F41C 27/00 42/90 |
| 2019/0162362 | A1* | 5/2019 | Chen | F16B 2/185 |
| 2023/0048054 | A1* | 2/2023 | Zhou | F16M 11/041 |
| 2024/0369915 | A1* | 11/2024 | Zeng | F16M 11/10 |
| 2024/0410515 | A1* | 12/2024 | Johnson, Sr. | F16M 13/00 |
| 2025/0020268 | A1* | 1/2025 | Wang | F16M 11/041 |
| 2025/0129881 | A1* | 4/2025 | Wang | F16M 11/2092 |

* cited by examiner

PAN AND TILT HEAD

CROSS-REFERENCE TO RELATED APPLICATIONS

This application is a continuation of Ser. No. 18/987,874, filed Dec. 19, 2024, which claims the benefit of U.S. Provisional Patent Application No. 63/615,939 , filed Dec. 29, 2023, the contents of both of which are hereby incorporated herein by reference.

TECHNOLOGY

The present disclosure relates to heads for mounting sensor devices such as cameras, radar, and lasers for tracking objects on a golf course and that are configured to pan and tilt to change the view angle of the sensor device.

BACKGROUND

A head may be used to mount a camera, radar, laser, or other device to a support. Various heads may be deployed at a golf tournament to track objects such as balls and players during tournament play. Each week, up to a hundred or more sensor devices may be setup on heads at a golf tournament and then disassembled and transported to the next tournament wherein they are set up again. Heads may include gears to move the sensor device and change the field of view. A motor may be used to drive the gears to pan and tilt the sensor device. In these applications it is generally necessary to monitor head location and synchronize control signals to head location to avoid damaging the head. This becomes an even more complex task when operating the head in a dynamic environment and from a remote location. Furthermore, tracking objects, particularly balls in flight, requires responsive motion control and a stable platform. However, current heads experience throwback, limiting stability of the sensor device.

What is needed is improved head designs for efficient mounting of devices to heads to enable quick setup, disassembly, replacement, and repair. What is also needed is alternative control systems for heads to better suit remote applications in dynamic environments and configurations to provide increased stability of sensor devices.

SUMMARY

In one aspect, a mounting surface for mounting a sensor device to a top plate of a head to track objects on a golf course during a golf tournament using the sensor device includes an upper mounting surface and a slot that extends through the upper mounting surface and that is defined by a base and sidewalls that extend from the base and that further define side grooves along lateral sides of the slot. A lateral extent of the side grooves is increased along a lower portion of the side grooves relative to an upper portion of the side grooves to provide a vertically limiting overhang portion that restricts vertical movement of a device mount of a mounting device having lateral portions that position below the vertically limiting overhang portion when slotted within the slot.

In one example, the sidewalls are inwardly angled from the base such that the side grooves together with the base define a dovetail slot for receiving a complementary dovetail shaped device mount of a sensor device to form a dovetail joint.

In the above or another example, one or more positioning members are configured to engage a portion of a device mount of a sensor device to aid in positioning the device mount relative to the mounting surface.

The one or more positioning members may include a slide stop that extends from the base of the slot and that is configured to engage a device mount of a sensor device to limit a longitudinal position of the device mount within the slot.

The slide stop may include a fitting configured to engage or mate with the device mount or attach to another fitting that secures the device mount relative to the slide stop.

The slide stop may be vertically translatable such that it may be selectively lowered to receive the device mount within the slot and subsequently raised to insert within a slot positioned along a lower side of the device mount.

In a further example, the one or more positioning members may include bias structures that are downwardly compressible to a compressed position to allow slotting of the device mount within the slot and upwardly biased from the compressed position to compress against or extend within the device mount.

The bias structures may comprise arcuate surfaces that may be compressed downwardly to a plane of the upper mounting surface and return to a position above the plane of the upper mounting surface.

The bias structures may include spheres comprising the arcuate surfaces and springs that upwardly bias the spheres.

In another aspect, a head to track objects on a golf course during a golf tournament using the sensor device comprises the mounting surface for mounting the sensor device as described in any of the examples above.

In yet another aspect, a method to track objects on a golf course during a golf tournament with a sensor device includes mounting a device mount of the sensor device to the mounting surface of a head comprising slotting a base of the mounting device into the slot of the mounting surface.

In still another aspect, a head for mounting a device for tracking objects on a golf course during a golf tournament includes a control system for controlling delivery of a supply of power to one or more of a tilt motor operable to drive tilt movement of a top plate of the head about a tilt axis relative to a stationary support or a pan motor operable to drive pan movement of the top plate of the head about a pan axis relative to the stationary support. The control system may include one or both of a tilt stop mechanism or a pan stop mechanism configured to limit the respective tilt movement or pan movement.

In one example, the tilt stop mechanism includes a tilt position indicator having a first tilt stop engagement surface and a second tilt stop engagement surface, a tilt limit switch, and a first and second tilt stop. The first tilt stop may operatively connect to the tilt limit switch and be positioned to be actuatingly engaged by the first tilt stop engagement surface at a first tilt limit to interrupt supply of power to the tilt motor that drives the tilt movement in a first direction. The second tilt stop may be operatively connected to the tilt limit switch and be positioned to be actuatingly engaged by the second tilt stop engagement surface at a second tilt limit to interrupt supply of power to the tilt motor that drives tilt movement in a second direction.

In the above or another example, the pan stop mechanism includes a pan position indicator having a first pan stop engagement surface and a second pan stop engagement surface, a pan limit switch, and a first and second pan stop. The first pan stop may be operatively connected to the pan limit switch and positioned to be actuatingly engaged by the first pan stop engagement surface at a first pan limit to interrupt supply of power to the pan motor that drives the pan movement in a first direction. The second pan stop may be operatively connected to the pan limit switch and positioned to be actuatingly engaged by the second pan stop engagement surface at a second pan limit to interrupt supply of power to the pan motor that drives pan movement in a second direction.

In one example, the tilt limit switch comprises a first tilt limit switch operable to interrupt the supply of power that drives tilt movement in the first direction when the first tilt stop is actuatingly engaged to a first position and to reset to a second position that allows power to be supplied to drive tilt movement in the first direction when the first tilt stop engagement surface disengages the first tilt stop.

The first tilt limit switch may be spring loaded to reset to the second position.

The tilt limit switch may include a second tilt limit switch operable to interrupt the supply of power that drives the tilt movement in the second direction when the second tilt stop is actuatingly engaged to a first position and to reset to a second position that allows power to be supplied to drive the tilt movement in the second direction when the second tilt stop engagement surface disengages the second tilt stop.

The second tilt limit switch is spring loaded to reset to the second position.

In any of the above or another example, the tilt position indicator may be positioned on a tilt shaft that extends along the tilt axis about which the top plate tilts between the first and second tilt limits in the first and second directions.

The first tilt stop may be positioned in the first direction with respect to the tilt axis and the second tilt stop is positioned in the second direction with respect to the tilt axis.

In any of the above or another example, the first and second tilt stop engagement surfaces are coupled to the tilt movement and move relative to the first and second tilt stops.

In any of the above or another example, the pan limit switch includes a first pan limit switch operable to interrupt the supply of power that drives pan movement in the first direction when the first pan stop is actuatingly engaged to a first position and to reset to a second position that allows power to be supplied to drive pan movement in the first direction when the first pan stop engagement surface disengages the first pan stop.

The first pan limit switch may be spring loaded to reset to the second position.

The pan limit switch may include a second pan limit switch operable to interrupt the supply of power that drives the pan movement in the second direction when the second pan stop is actuatingly engaged to a first position and to reset to a second position that allows power to be supplied to drive the pan movement in the second direction when the second pan stop engagement surface disengages the second pan stop.

The second pan limit switch may be spring loaded to reset to the second position.

In one example, the second positions of the first and second pan stops are the same.

In any of the above or another example, the head comprises a frame to which the pan motor and top plate mount, and the pan movement pans the frame relative to the stationary support.

The first and second pan stops may be coupled to the pan movement and the first and second pan stop engagement surfaces maintain a stationary position corresponding to the stationary support.

In any of the above examples, the head may comprise a mounting surface as described above.

In still another aspect, a method of using the head includes controlling tilt movement of a top plate, pan movement of a top plate, or both using the limit switches and stops.

In one aspect, a head for mounting a device for tracking objects on a golf course during a golf tournament includes a frame, a top plate mounted on the frame, a tilt shaft, a tilt drive gear mounted on the tilt shaft, a tilt gear positioned to engagingly mesh with the tilt drive gear and be driven to rotate by rotation of the tilt shaft via the mesh engagement with the tilt drive gear, wherein rotation of the tilt gear causes the top plate to tilt about a tilt axis, tilt motor operatively coupled to the tilt shaft to transfer torque output by the tilt motor to tilt shaft to rotate the tilt shaft, and a tilt shaft adjustment mechanism.

The tilt shaft adjustment mechanism may include a tilt adjustment plate configured to adjustably mount to the frame in a plurality of orientations to increase or decrease a degree of mesh between the tilt drive gear and tilt gear, tilt adjustment slots extending through the frame and tilt adjustment plate, and tilt adjustment locks configured to extend through the tilt adjustment slots to fix an orientation of the tilt adjustment plate. The tilt adjustment slots may extend through at least one of the frame or tilt adjustment plate and comprise arcuate openings having a common center point. The tilt shaft may be rotatably mounted to the tilt adjustment plate at a position bounded by the tilt adjustment slots and offset from the center point when the tilt adjustment plate is mounted to the frame. The orientation of the tilt shaft may be adjusted by loosening the tilt adjustment locks and rotating the tilt adjustment plate to move the tilt shaft along a tilt adjustment arc having a radius corresponding to an offset distance of the tilt shaft relative to the center point.

In one example, the tilt adjustment slots comprising arcuate openings that lie along a same circumference.

In the above or another example, the tilt adjustment plate includes the tilt adjustment slots comprising arcuate openings.

In any of the above or another example, the tilt adjustments slots including the arcuate openings extend along approximately 45° arcs to provide 45° of available rotation in the orientation of the tilt adjustment plate.

In any of the above or another example, the tilt motor outputs torque to a tilt shaft drive gear and engagingly meshes with a tilt shaft gear to transfer the torque to the tilt shaft.

In a further example, the tilt motor adjustably mounts to the frame to provide independent adjustment of the mesh engagement between the tilt shaft drive gear and the tilt shaft gear.

In another aspect, a head for mounting a device for tracking objects on a golf course during a golf tournament includes a frame, a top plate mounted on the frame, a pan shaft, a pan drive gear mounted on the pan shaft, a pan gear positioned to engagingly mesh with the pan drive gear and be driven to rotate by rotation of the pan shaft via the mesh engagement with the pan drive gear, a pan motor operatively coupled to the pan shaft to transfer torque output by the pan motor to pan shaft to rotate the pan shaft, and a pan shaft adjustment mechanism. Rotation of the pan gear is operable to cause the top plate to pan about a pan axis. The pan shaft adjustment mechanism may include a pan adjustment plate configured to adjustably mount to the frame in a plurality of orientations to increase or decrease a degree of mesh between the pan drive gear and pan gear, pan adjustment slots extending through the frame and pan adjustment plate, pan adjustment locks configured to extend through the pan adjustment slots to fix an orientation of the pan adjustment plate. The pan adjustment slots that extend through at least one of the frame or pan adjustment plate comprise arcuate openings having a common center point. The pan shaft is rotatably mounted to the pan adjustment plate at a position bounded by the pan adjustment slots and offset from the center point when the pan adjustment plate is mounted to the frame. The orientation of the pan shaft may be adjusted by loosening the pan adjustment locks and rotating the pan adjustment plate to move the pan shaft along a pan adjustment arc having a radius corresponding to an offset distance of the pan shaft relative to the center point.

In one example, the pan adjustment slots comprising arcuate openings lie along a same circumference.

In the above or another example, the pan adjustment plate includes the pan adjustment slots comprising arcuate openings.

In any of the above or another example, the pan adjustments slots including the arcuate openings extend along approximately 45° arcs to provide 45° of available rotation in the orientation of the pan adjustment plate.

In any of the above or another example, the pan motor outputs torque to a pan shaft drive gear and engagingly meshes with a pan shaft gear to transfer the torque to the pan shaft.

In one example, the pan motor adjustably mounts to the frame to provide independent adjustment of the mesh engagement between the pan shaft drive gear and the pan shaft gear.

In still another aspect, a head for mounting a device for tracking objects on a golf course during a golf tournament includes a frame, a top plate mounted on the frame, a shaft, a drive gear mounted on the shaft, a gear positioned to engagingly mesh with the drive gear and be driven to rotate by rotation of the shaft via the mesh engagement with the drive gear, wherein rotation of the gear causes the top plate to move about an axis, a motor operatively coupled to the shaft to transfer torque output by the motor to shaft to rotate the shaft, and a shaft adjustment mechanism to adjust the position of the drive gear with respect to the gear to increase or decrease mesh engagement. In one example, the shaft adjustment mechanism includes a tilt shaft adjustment mechanism or a pan shaft adjustment mechanism. In a further embodiment, the head includes both a tilt shaft and a pan shaft adjustment mechanism. In one example, the tilt shaft adjustment mechanism, pan shaft adjustment mechanism, or both are as described with respect to any of the above examples or combination of examples.

In yet another aspect, a method of adjusting a tilt shaft or pan shaft of a head may include unlocking adjustment locks securing an adjustment plate to a frame, wherein the adjustment locks comprise arcuate openings having a common center point, and wherein the tilt shaft or pan shaft is rotatably mounted to the adjustment plate at a location offset from the center point. The method may further include rotating the adjustment plate to adjust the location of the tilt shaft or pan shaft along an adjustment arc having a radius corresponding to an offset distance of the tilt shaft or pan shaft relative to the center point. The method may further include securing the adjustment locks to secure the adjustment plate to the frame and fix the adjusted location of the tilt shaft or pan shaft.

In one example, the head is as described above in any of the examples or combinations examples of the head including a tilt or pan shaft adjustment mechanism. In this or another example, the head includes a mounting surface along a top plate as described in any of the above examples or combination of examples.

DRAWINGS

The novel features of the described embodiments are set forth with particularity in the appended claims. The described embodiments, however, both as to organization and manner of operation, may be best understood by reference to the following description, taken in conjunction with the accompanying drawings in which:

Figure 5:
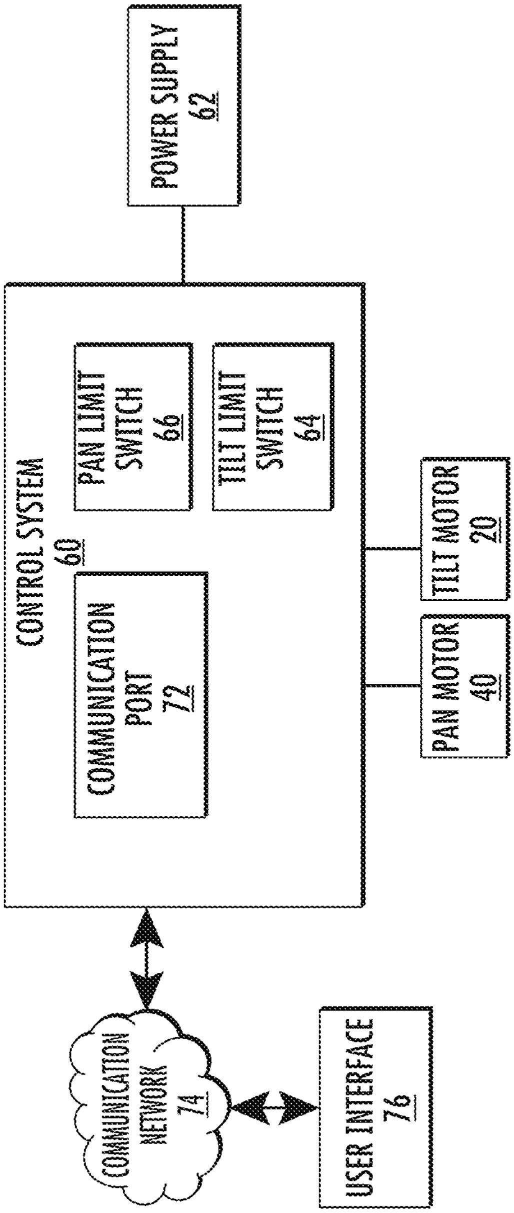
Figure 6:
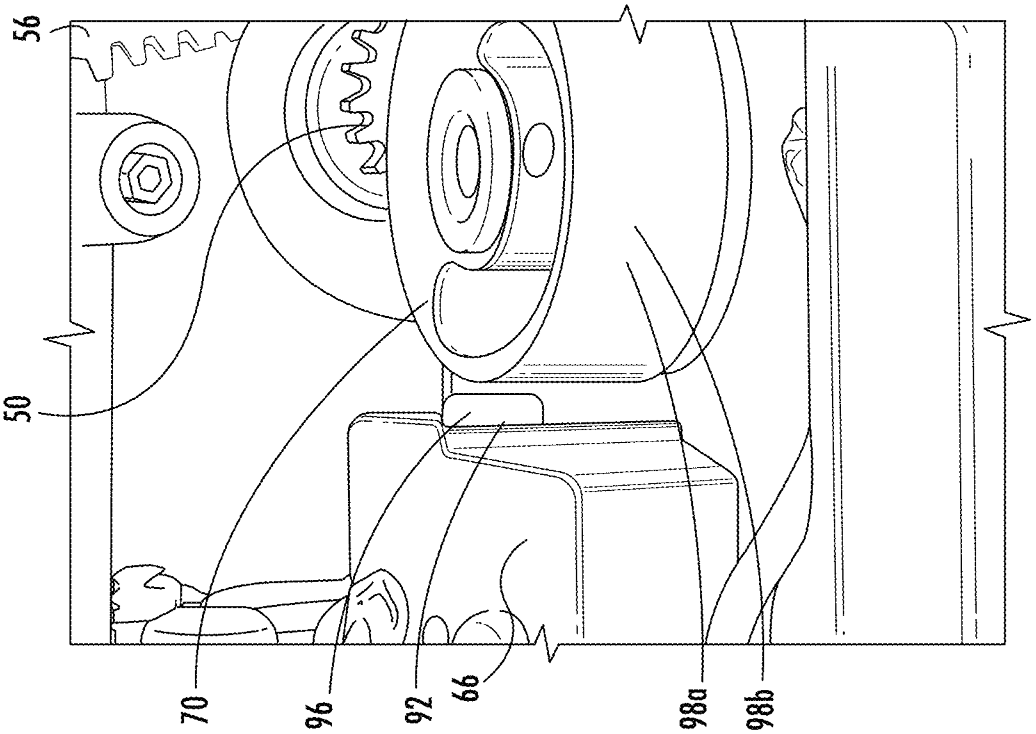
Figure 7:
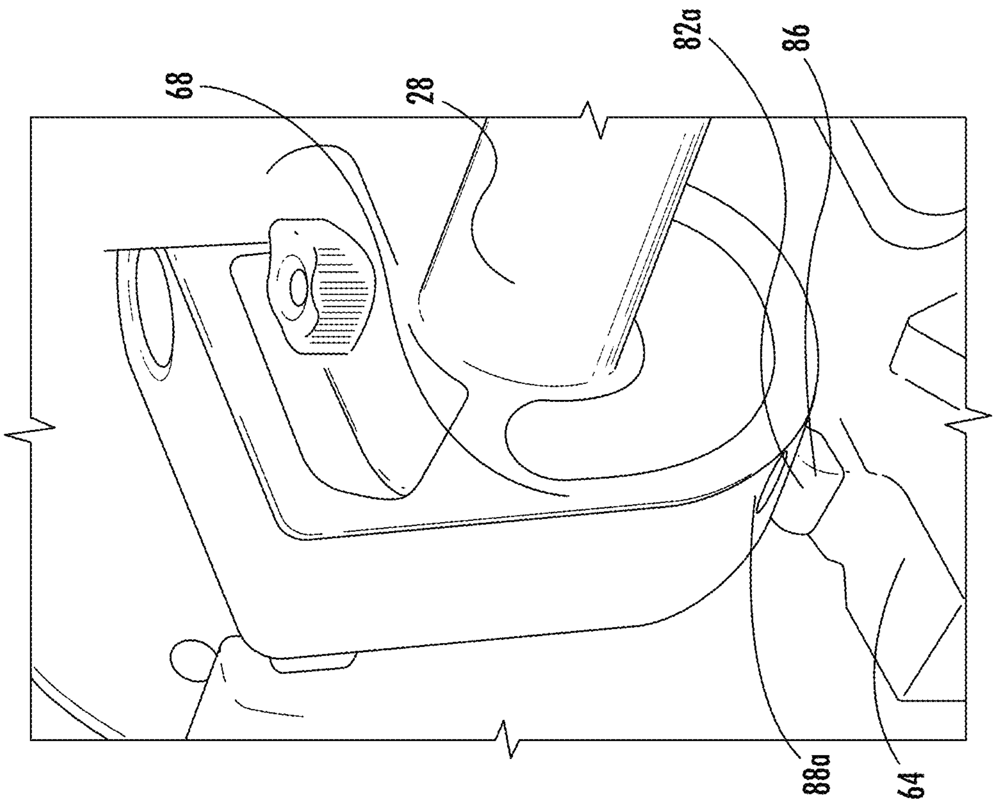
Figure 8C:
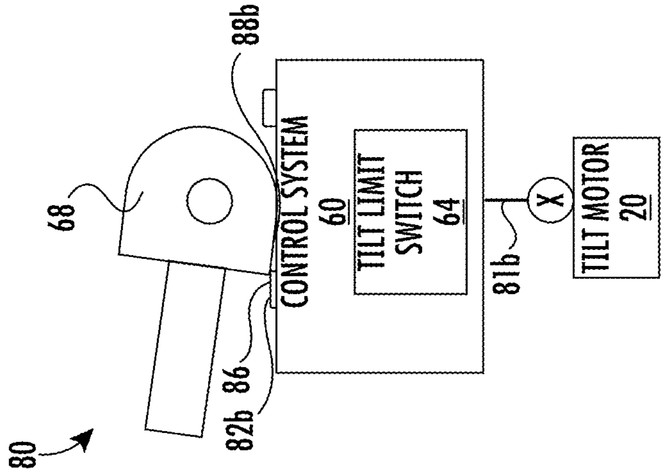
Figure 8B:
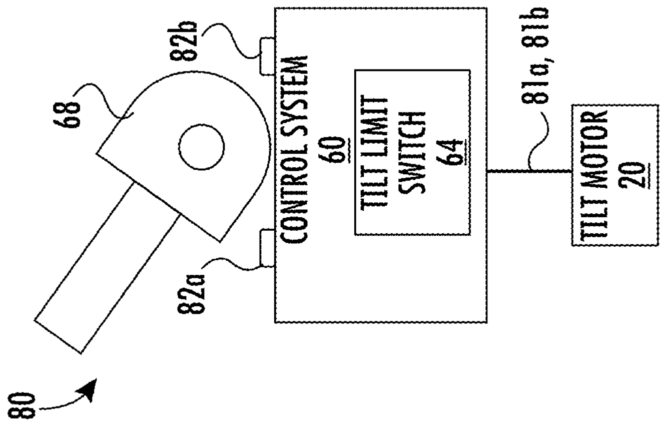
Figure 8A:
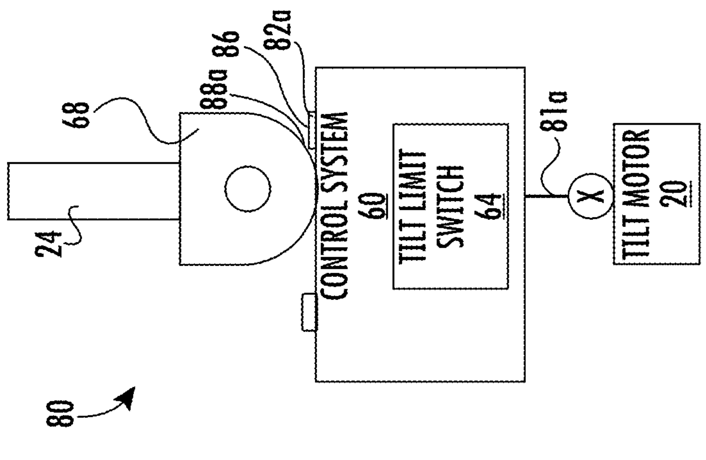
Figure 9C:
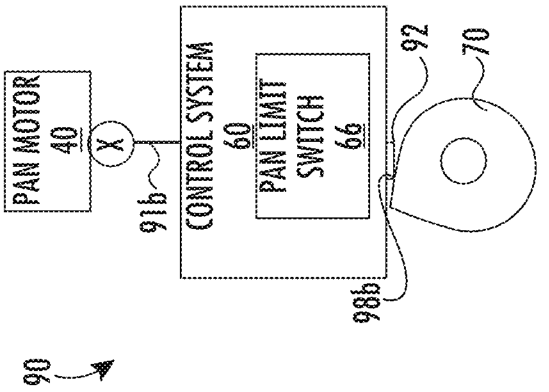
Figure 9B:
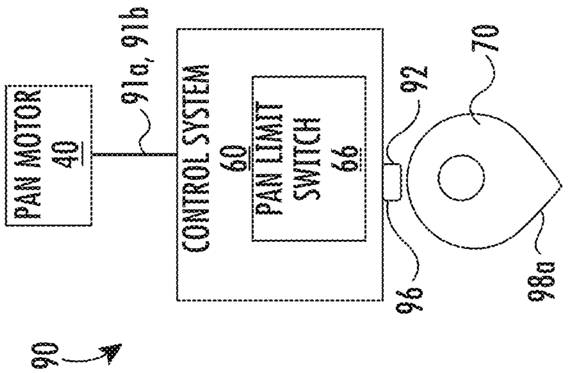
Figure 9A:
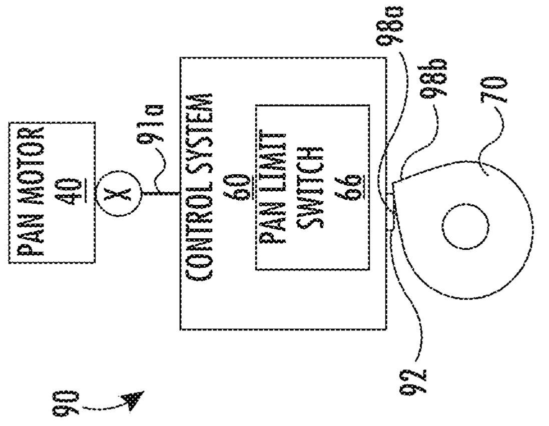
Figure 11:
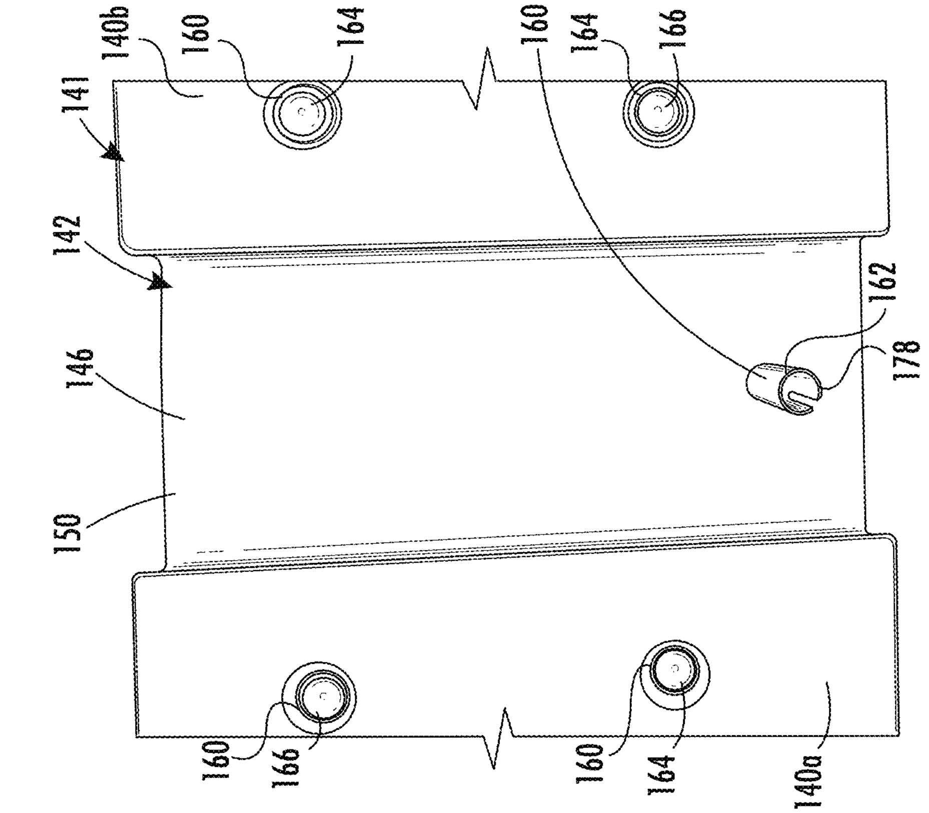
Figure 10:
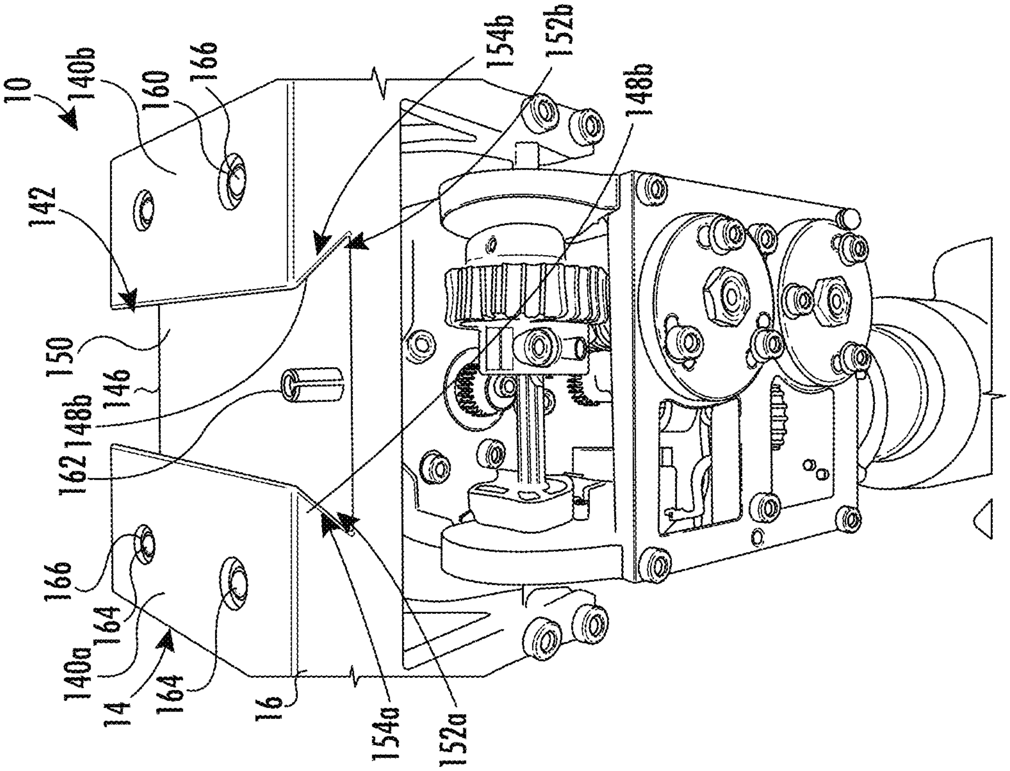
Figure 12:
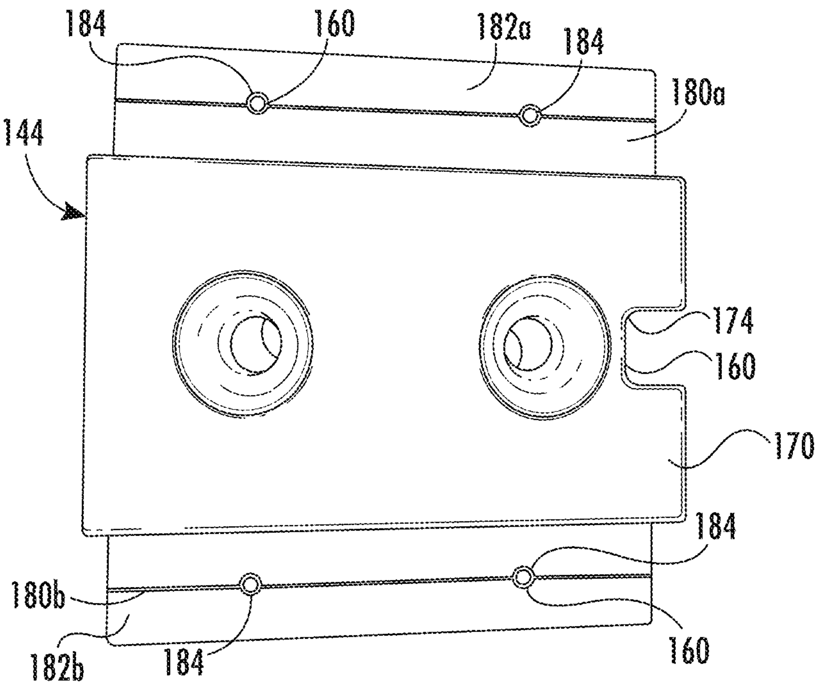
Figure 13:
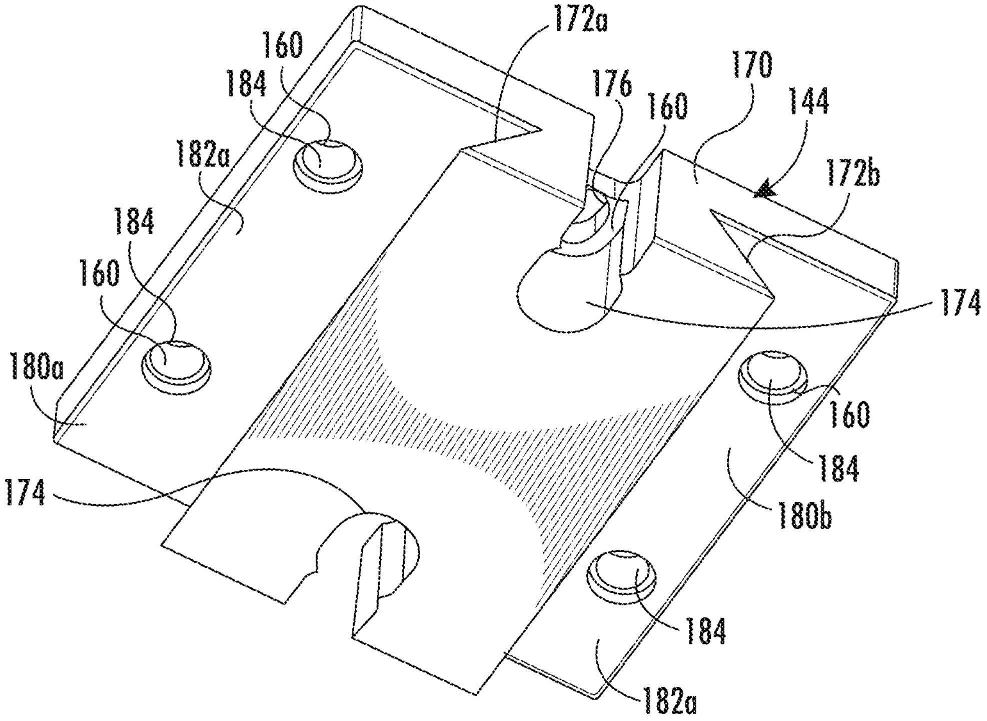
Figure 14:
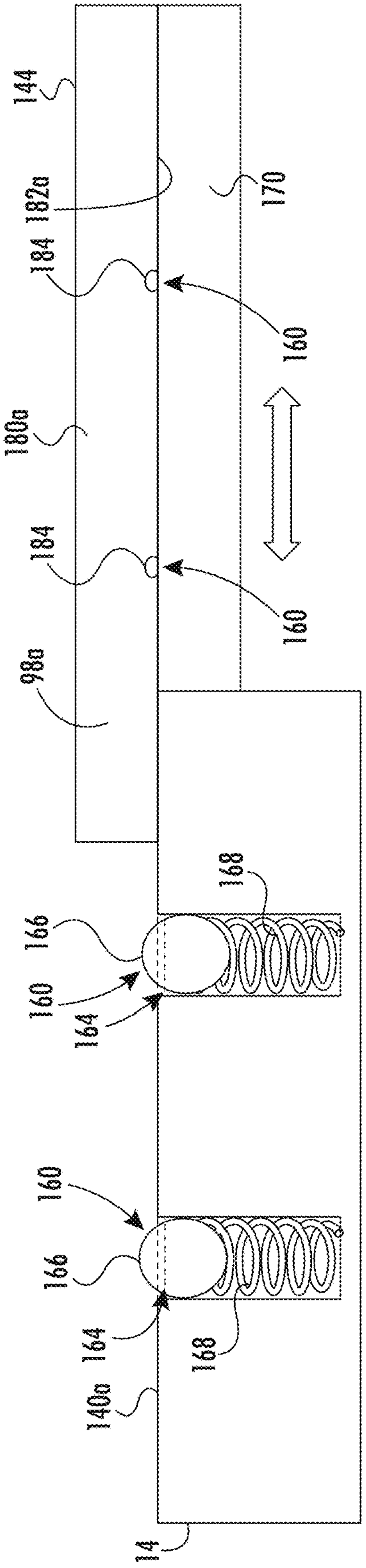
Figure 15:
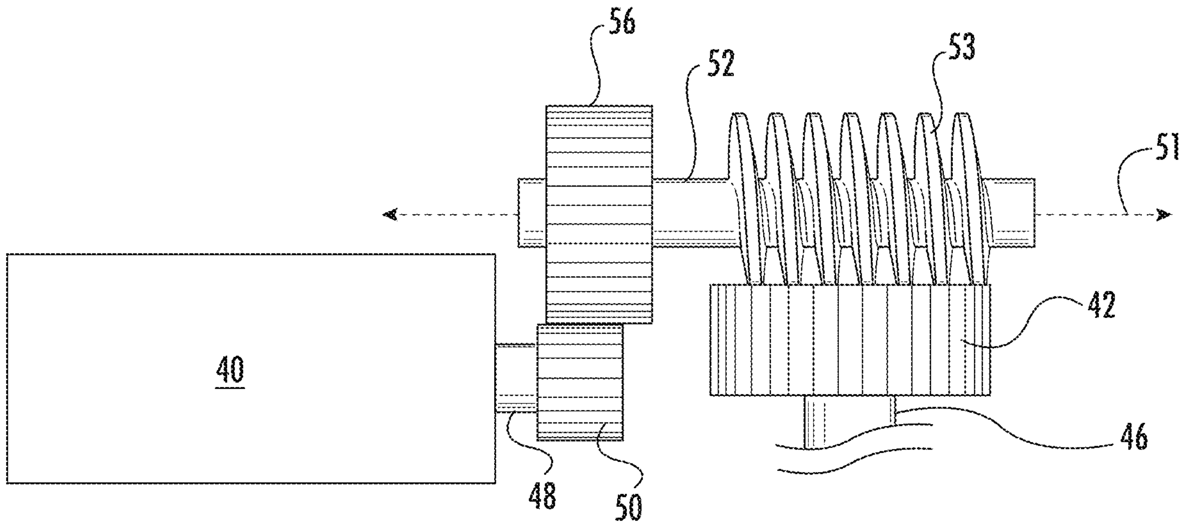

FIG. 5 schematically illustrates a control system for a head according to various embodiments described herein;

FIG. 6 is a magnified view of a tilt stop switch mechanism according to various embodiments described herein;

FIG. 7 is a magnified view of a pan stop switch mechanism according to various embodiments described herein;

FIGS. 8A-8C semi-schematically illustrate operation of a tilt stop switch mechanism according to various embodiments described herein;

FIGS. 9A-9C semi-schematically illustrate operation of a pan stop switch mechanism according to various embodiments described herein; and FIG. 10 is an elevated front view of a head providing a perspective view of a quick mounting surface for mounting devices to the head according to various embodiments described herein;

FIG. 11 is a top view of the mounting surface shown in FIG. 10 according to various embodiments described herein;

FIG. 12 is a bottom view of a device mount for mounting to a quick mounting surface of a head according to various embodiments described herein;

FIG. 13 is a bottom view in perspective of a device mount for mounting to a quick mounting surface of a head according to various embodiments described herein;

FIG. 14 illustrates mounting a device mount on a quick mounting surface according to various embodiments described herein;

FIG. 15 illustrates an isolated view of a pan motor and pan drive configuration according to various embodiments described herein.

DESCRIPTION

FIGS. 1-15 illustrate various embodiments and features of a head 10 for a support tower.

With particular reference to FIGS. 1-4 and FIG. 15, a head 10 for a support 12 of a support tower may be configured for mounting a device such as a camera, radar, or laser device (not shown) to a mounting surface 14 of a top plate 16. The head 10 may be configured to move the top plate 16 such that the sensor device undergoes one or more controlled motions relative to the support 12. For example, the head 10 may be configured to drive a tilt or pitch movement, pan or yaw movement, or both such that the sensor device may be tilted or panned to change the field of view of the sensor device.

As introduced above, the head 10 may be configured to tilt the top plate 16. In one example, the head 10 includes a frame 18 and a tilt motor 20 mounted to the frame 18. The tilt motor 20 may be operably coupled to a tilt gear 22 to drive pivoting of a tilt arm 24 attached to the top plate 16 about a tilt axis 26. Various gearing systems may be utilized to cause pivoting of the tilt arm 24. In the illustrated embodiment, the tilt gear 22 is coupled to a tilt axle 28 in a rotationally fixed relationship. The tilt axle 28 extends along the tilt axis 26. The tilt axle 28 is attached to the tilt arm 24 in a rotationally fixed relationship. In operation, torque output from the tilt motor 20 is transferred to the tilt gear 22 to drive rotation of the tilt axle 28 to thereby rotate the tilt arm 24 about the tilt axis 26. The tilt motor 20 includes an output shaft 30 having a tilt shaft drive gear 31 that rotates with the output shaft 30. A tilt shaft gear 33 is positioned on a tilt shaft 32 and operably engages and is driven to rotate by the tilt shaft drive gear 31 to rotate the tilt shaft 32 on a tilt shaft axis 34 that the tilt shaft 32 extends along. The tilt shaft 32 also includes a tilt drive gear 36 that rotates with the tilt shaft 32 and operatively engages the tilt gear 22 to drive pivoting of the tilt arm 24 about the tilt axis 26 by driving rotation of the tilt axle 28. In the illustrated embodiment, the tilt drive gear 36 and tilt gear 22 are provided in a worm gear arrangement wherein the tilt drive gear 36 comprises a worm and the tilt gear 22 comprises a worm wheel.

The head 10 may be configured to tilt the top plate 16 within any desired tilt range, such as 180° or more from horizontal or 90° or more from vertical in either direction. In the illustrated embodiment, the head 10 is configured to tilt the top plate 16 between an approximately horizontal position wherein the mounting surface 14 of the top plate 16 is positioned approximately perpendicular to a support axis 38 and an approximately vertical position wherein the mounting surface 14 of the top plate 16 is positioned approximately parallel to the support axis 38. Those having skill in the art will appreciate upon reading the present disclosure that the sensor device may be mounted at various angles with respect to the top plate 16. The tilt arm 24 may similarly attach to the top plate 16 at various non-parallel angles to the support axis 38. Thus, the location of the tilt range as well as the degree of tilt available within the range with respect to the frame 18 and support axis 38 may be modified such that the view angle of the sensor device may be translated within the desired viewable field without departing from the present description.

In various embodiments, the head 10 may be configured to pan the top plate 16 relative to the support axis 38. For example, the head 10 may rotatably mount to the frame 18 via a pan bearing 54. A pan motor 40 is mounted to the frame 18 and is operably coupled to a pan gear 42 to drive pivoting of the frame 18 about a pan axis 44. Those having skill in the art will appreciate upon reading the present disclosure that many suitable gearing systems may be utilized to cause pivoting of the frame 18. In the illustrated embodiment, the pan gear 42 is coupled to a pan pivot post 46 in a rotationally fixed relationship. The pan pivot post 46 extends along the support axis 38 and the frame 18 mounts to the pan pivot post 46 via the pan bearing 54 to allow the frame 18 to pivot about the pan pivot post 46. In operation, torque output from the pan motor 40 is transferred to the pan gear 42 to drive pivoting of the frame 18 on the pan bearing 54 to thereby rotate the top plate 16 with respect to the pan axis 44. The pan motor 40 includes an output shaft 48 having a pan shaft drive gear 50 that rotates with the output shaft 48. A pan shaft gear 56 operably engages and is driven to rotate by the pan shaft drive gear 50 to rotate the pan shaft 52 on a pan shaft axis 51 that the pan shaft 52 extends along. The pan shaft 52 also includes a pan drive gear 53 that rotates with the pan shaft 52 and operatively engages the pan gear 42 to drive pivoting of the frame 18 about the pan axis 44 when driven against the stationary pan gear 42. In the illustrated embodiment, the pan drive gear 53 and pan gear 42 are provided in a worm gear arrangement wherein the pan drive gear 53 comprises a worm and the pan gear 42 comprises a worm wheel.

In the illustrated embodiment, the head 10 is configured to pivot the top plate 16 relative to the pan axis 44 approximately 360°. It will be appreciated that the head 10 may be configured to pivot the top plate 16 within any desired range pan range, such as anywhere between 1° and 360°.

With particular reference to FIG. 5, the head 10 may include a control system 60 configured to control operations of the head 10. The control system 60 may include a control board including one or more circuits. Circuits may include various circuit components such as one or more capacitors, physical or electrical interlocks, resistors, transistors, switches, or combination thereof for controlling power to the tilt motor 20, pan motor 40, or both. In one example, one or more circuits are provided to control of power from a power supply 62 to the tilt motor 20, and one or more circuits are provided with respect to control of power from the power supply 62 to the pan motor 40. For example, a first electrical signal supplied to control system 60 may cause the control system 60 to route a supply of power to the pan motor 40 or tilt motor 20 that causes the motor to operate in a first mode to drive pan or tilt motion in a first direction. A second electrical signal supplied to the control system 60 may cause the control system 60 to route a supply of power to the pan motor 40 or tilt motor 20 may cause the motor to operate in a second mode to drive pan or tilt motion in a second direction. In one example, a positive voltage supplied to the tilt motor 20 may cause the tilt motor 20 to rotate in a direction that drives the tilt gear 22 in a first direction. A negative voltage supplied to the tilt motor 20 may cause the tilt motor 20 to rotate in a direction that drives the tilt gear 22 in a second direction. The first direction or second direction may result in the tilt axle 28 tilting the top plate 16 in an upward arc and the other direction may result in the tilt axle 28 tilting the top plate 16 in a downward arc. Similarly, a positive voltage supplied to the pan motor 40 may cause the pan motor 40 to rotate in a direction that drives the pan gear 42 in a first direction. A negative voltage supplied to the pan motor 40 may cause the pan motor 40 to rotate in a direction that drives the pan gear 42 in a second direction. The first direction or second direction may result in the frame 18 rotating on the pan bearing 54 in a clockwise direction and the other direction may result in the frame 18 rotating on the pan bearing 54 in a counterclockwise direction.

The control system 60 may utilize one or more limit switches 64, 66 positioned to limit a range of tilt or pan. Example limit switches include single pole multi-throw, such as double throw, multi-pole single throw, such as double pole single throw, or multi-pole multi-throw, such as double pole double throw. Limit switches may be normally closed or normally open. Limit switches may include an actuator, such as a lever or plunger. The head 10 may include position indicators that move relative to the actuators when the head 10 drives pan or tilt movement. The position indicators may include a surface positioned to directly operatively contact the actuator or cause operative contact with the actuator to actuate the same. For example, limit switches may utilize contact with the tilt position indicator 68 or pan position indicator 70 (see, e.g., FIGS. 6 & 7) to cause switch operation. Switch operation may discontinue supply of power to the pan or tilt motor 20 driving the motor in the current direction. The control system 60 may include a wired or wireless communication port 72 configured to communicate via a wired or wireless communication network 74 to receive control instructions for operation of the head 10. For example, the control system 60 may include a communication port 72 configured to provide wired or wireless data communication with a wireless communication devices, such as the user interface 76. The user interface 76 may interface users with operations of the control system 60. The user interface 76 may provide users hard or soft controls for controlling transmission of electrical signals to the control system 60 directing control of the motors, thereby allowing users to control the movements of the head 10. In some embodiments, the user interface 76 may provide users additional monitoring functions such as current operation statuses, identity of a sensor device, historical motion or position data with respect to top plate 16, current motion or position data with respect to the top plate 16, or combination thereof. In one example, the control system 60 is accessible anywhere in the world via an internet connection or in a cloud computing environment. In a further embodiment, the user interface 76 may be configured to be in wired or wireless communication with control systems 60 of a plurality of heads 10 to one or more of control or monitor the same.

Further to the above, the head 10 may include stop switch mechanisms configured to define an allowable range the motors may tilt or pan the top plate 16. A stop switch mechanism may include one or more limit switches, as introduced above, and one or more position indicators. A limit switch may be operatively connected to a stop. The stop may comprise an actuator that when engaged by the position indicator, causes actuation of the limit switch.

In some embodiments, multiple tilt or pan stops and tilt or pan position indicators may be provided. For example, a first pan stop and a first pan position indicator may be provided to set a limit to the range of pan in a first direction and the second pan stop and second pan position indicator 70 may be provided to set a limit of the range of pan in a second direction. In some instances, a first tilt stop may also be a second tilt stop or a first tilt position indicator may also be a second tilt position indicator.

In one configuration, stops may provide a hard stop that physically limits tilt or pan motion beyond the defined allowable range. For example, a tilt stop may be positioned to interact with a tilt position indicator to physically block further tilt motion.

In various embodiments, the head 10 includes a tilt stop switch mechanism 80. With particular reference to FIG. 6, providing a magnified view of a tilt stop switch mechanism 80, and FIGS. 8A-8C, providing a semi-schematic representation of the operation of a tilt stop switch mechanism 80, the tilt stop switch mechanism 80 may be configured to limit the range or degree of tilt in one or more tilt directions. The tilt stop switch mechanism 80 may include a tilt limit switch 64, one or more tilt stops 82*a*, 82*b*, and a tilt position indicator 68 84. The tilt limit switch 64 is configured to cause power driving the tilt motor 20 in a current direction to be discontinued when the tilt limit switch 64 is engaged to prevent continuation of tilt motion. For example, the tilt limit switch 64 may be normally closed, and engagement of the tilt limit switch 64 may open the circuit to prevent power delivery to the tilt motor 20. Normally open configurations may also be used. Operation of the tilt limit switch 64 may signal to or interrupt the power delivery to the tilt motor 20 that is driving the tilt motor 20 in the current direction.

The one or more tilt stops 82*a*, 82*b* are configured to interact with the tilt position indicator 68 and cause engagement of the tilt stop switch when the tilt position indicator 68 is at a predefined location relative to the tilt stop 82*a*, 82*b* corresponding to a stop position of the range of tilt of the top plate 16. A tilt stop 82*a*, 82*b* may comprise or be operatively connected to an actuator 86 of the tilt limit switch 64 to operate the switch to cause switching. For example, the tilt stop 82*a*, 82*b* may comprise an actuator 86 that when contacted by the tilt position indicator 68, the relative movement between the tilt stop 82*a*, 82*b* and tilt position indicator 68 drives actuation of the tilt limit switch 64. Additionally or alternatively, actuation may cause a signal to be generated to engage the tilt limit switch 64. For example, contact between the tilt stop 82*a*, 82*b* and tilt position indicator 68 may toggle a switch or otherwise modify a voltage received by the tilt stop switch or intermediate device or circuit of the control system 60 that is used as a signal to cause the tilt limit switch 64 to engage. In some embodiments, each tilt stop 82*a*, 82*b* causes actuation of a separate switch or step of a single switch.

In the illustrated embodiment, a tilt position indicator 68 is mounted to the tilt axle 28 and includes two tilt stop engagement surfaces 88*a*, 88*b* that rotate with the tilt axle 28. A tilt stop 82*a*, 82*b* is proved at a position corresponding to the location of the respective tilt stop engagement surface 88*a*, 88*b* at each end of the desired range of tilt. The tilt stop engagement surfaces 88*a*, 88*b* are proved along an arcuate surface. Surfaces having non-arcuate contours may also be used. The tilt stops 82*a*, 82*b* comprise switch actuators that interrupt power delivery to the tilt motor 20. The switch actuators are spring loaded to interrupt power delivery to drive the tilt motor 20 in the respective limit direction until the tilt axle 28 is moved in the other direction, toward the other limit, sufficient to move the respective tilt stop engagement surface 88*a*, 88*b* from the actuating engagement with the respective tilt stop 82*a*, 82*b*.

In FIG. 8A, a clockwise supply current 81*a* has driven the tilt axle 28 to the clockwise limit of the tilt range and the first tilt stop engagement surface 88*a* of the tilt position indicator 68 has engaged the first tilt stop 82*a* to operate the limit switch to interrupt delivery of the clockwise supply current 81*a* to the tilt motor 20, which is indicated with an "X" in the clockwise supply current 81*a*. In FIG. 8B, the tilt motor 20 has rotated the tilt axle 28 in the counterclockwise direction within the allowable tilt range. Within the allowable tilt range, the control system 60 may be used to control power delivery to the tilt motor 20 and provide a clockwise or counterclockwise supply current 81*a*, 81*b* to drive the tilt axle 28 and coupled top plate 16 toward any end of the tilt range. In FIG. 8C, a counterclockwise supply current 81*b* has been supplied to the tilt motor 20 and the tilt axle 28 has been rotated to the counterclockwise tilt limit and the second tilt stop engagement surface 88*b* of the tilt position indicator 68 has engaged the second tilt stop 82*b* to operate the limit switch and stop power delivery of the counterclockwise supply current 81*b* to the tilt motor 20, which is indicated by an "X". At this point, the control system 60 will not allow power delivery of counterclockwise supply current 81*b* to the tilt motor 20 to drive counterclockwise movement, only clockwise supply current 81*a* may be supplied to drive clockwise movement away from the counterclockwise limit.

In the illustrated embodiments, the tilt position indicator 68 tilts with the tilt axle 28 and relative to the tilt stops 82*a*, 82*b*, which are in a fixed relationship with the frame 18. However, those having skill in the art will appreciate upon reading the present disclosure that relative movement between the tilt position indicator 68, or operative stop engagement surfaces 88*a*, 88*b* thereof, and tilt stops 82*a*, 82*b* corresponding to the limits of the range of tilt may be provided by rearranging the components. For example, the tilt position indicator 68, or one or more operative tilt stop engagement surfaces 88*a*, 88*b* thereof, may be fixed with respect to the frame 18 and the corresponding tilt stops 82*a*, 82*b* may be positioned to tilt with the tilt axle 28. The location of the tilt stops 82*a*, 82*b* and tilt position indictor 68 may be modified in any manner such that the tilt stops 82*a*, 82*b* and tilt stop engagement surfaces 88*a*, 88*b* move relative to each other corresponding to the tilt movement of the head 10 and engage at the desired tilt limits.

In various embodiments, the head 10 includes a pan stop switch mechanism 90. With specific reference to FIG. 7, providing a magnified view of the pan limit switch mechanism 90, and FIGS. 9A-9C, providing a visual representation of the operation of the pan stop mechanism 90, the pan stop switch mechanism 90 may include a pan limit switch 66 configured to cause power driving the pan motor 40 in a particular direction to be discontinued when the pan limit switch 66 is engaged to prevent continuation of pan motion in that direction. For example, the pan limit switch 66 may be normally closed, and engagement of the pan limit switch 66 may open the circuit to prevent continuation of the power delivery to the pan motor 40. Normally open configurations may also be used. Operation of the pan limit switch 66 may signal to or interrupt the power delivery to the pan motor 40 that is driving the pan motor 40 in the current direction.

The pan stop switch mechanism 90 may include one or more pan stops 92 configured to interact with a pan position indicator 70 and cause actuating engagement of the pan limit switch 66 when the pan position indicator 70 is at a predefined location relative to the pan stop 92 corresponding to a stop position of the range of pan of the top plate 16. The pan stop 92 may comprise or be operatively connected to an actuator 96 of the pan limit switch 66 to operate the switch to cause switching. For example, the pan stop 92 may comprise an actuator 96 that when contacted by the pan position indicator 70, the relative movement between the pan stop 92 and pan position indicator 70 drives actuation of the pan limit switch 66. Additionally or alternatively, actuation may cause a signal to be generated to engage the tilt limit switch 64. For example, contact between the pan stop 92 and pan position indicator 70 may toggle a switch or otherwise modify a voltage received by the pan limit switch 66 or intermediate device or circuit of the control system 60 that is used as a signal to cause the tilt limit switch 64 to engage. In some embodiments, each stop 92 causes actuation of a separate switch or step of a single switch.

In the illustrated embodiment, the pan position indicator 70 is provided in a fixed relationship with the pan gear 42. The pan position indicator 70 includes two pan stop engagement surfaces 98*a*, 98*b* configured to engage the pan stop 92 at respective pan limit positions. The pan stop 92 comprises a switch actuator that when actuatingly engaged by a first pan stop engagement surface 98*a*, corresponding to a first direction limit, interrupts power delivery to the pan motor 40 in the first direction. Power delivery to the pan motor 40 may still be provided to drive pan movement in a second direction, away from the first direction limit. The switch actuator is spring loaded to return to a center position, away from the first pan direction limit, when the first pan stop engagement surface 98*a* sufficiently moves in the second direction as to disengage the pan stop 92 actuator switch in the first direction. In the center position, the pan stop 92 does not interrupt power delivery to the pan motor 40 in the first or second direction. When the pan stop 92 is actuatingly engaged by the second pan stop engagement surface 98*b*, the switch actuator interrupts power delivery in the second direction. Power delivery to the pan motor 40 may still be provided to drive pan motion in the first direction, away from the second direction limit. The switch actuator is spring loaded to return to the center position, away from the second pan direction limit, when the second pan stop engagement surface 98*b* sufficiently moves in the first direction as to disengage the pan stop 92 actuator switch in the second direction.

In FIG. 9A, a counterclockwise supply current 91*a* has driven the frame 18, or top plate 16 attached thereto, to the counterclockwise limit position of the pan range and the first pan stop engagement surface 98*a* of the pan position indicator 70 has actuatingly engaged the pan stop 92 to operate the pan limit switch 66 to interrupt the counterclockwise supply current 91*a* to the pan motor 40, which is indicated by an "X" in counterclockwise supply current 91*a*. At this point, the control system 60 will not allow a counterclockwise supply current 91*a* to power the pan motor 40 to drive counterclockwise movement, only a clockwise supply current 91*b* may be supplied to drive clockwise movement away from the counterclockwise limit until sufficient clockwise movement has taken place to move the first pan stop engagement surface 98*a* from actuating engagement with pan stop 92 in the counterclockwise direction to deactivate the switch via spring loaded bias to a center position. In FIG. 9B, the pan motor 40 has rotated the top plate 16 in the clockwise direction within the allowable pan range. Within this allowable pan range, the control system 60 may be used to control power delivery to the pan motor 40 and provide a counterclockwise or clockwise supply current 91*a*, 91*b* to drive panning of the top plate 16, which includes panning of the frame 18 in this embodiment, between the pan limits. In FIG. 9C, a clockwise supply current 91*b* has been provided and the top plate 16 has rotated to the clockwise limit of the pan range, causing the second pan stop engagement surface 98*b* of the pan position indicator 70 to engage the pan stop 92. Engagement with the pan stop 92 operates the pan limit switch 66 and caused interruption of the clockwise supply current 91*b* to the pan motor 40, which is indicated by an "X". At this point, the control system 60 will not allow a clockwise supply current 91*b* to power the pan motor 40 to drive clockwise movement, only a counterclockwise supply current 91*a* may be supplied to drive counterclockwise movement away from the clockwise limit until sufficient counterclockwise movement has taken place to move the second pan stop engagement surface 98*b* from actuating engagement with pan stop 92 in the clockwise direction to deactivate the switch via spring loaded bias to the center position.

In the illustrated embodiments, the pan position indicator 70 is stationary relative to the panning motion imparted to the pan stop 92. However, those having skill in the art will appreciate upon reading the present disclosure that relative movement between the pan position indicator 70, or operative pan stop engagement surfaces 98*a*, 98*b* thereof, and pan stops 92 corresponding to the limits in the range of pan may be provided by rearranging the components. For example, the pan stop 92 may be fixed with respect to the frame 18 and the pan position indicator 70 may be positioned to pan with the top plate 16. The location of the pan stop 92 and pan position indictor 70 may be modified in any manner such that the pan stop 92 or stops and operative pan stop engagement surfaces 98*a*, 98*b* move relative to each other corresponding to the pan movement of the head 10 and engage at the desired pan limits.

The head 10 may include one or more adjustment mechanisms to adjust the location of the tilt shaft 32, pan shaft 52, or both. The adjustment mechanism may enable a user to quickly adjust the degree of mesh between the tilt drive gear 36 and the tilt gear 22 or the pan drive gear 53 (see FIG. 15) and the pan gear 42. Adjusting the degree of mesh may be used to decrease or increase backlash, which decreases or increases throwback as applied to the top plate 16.

Figure 2:
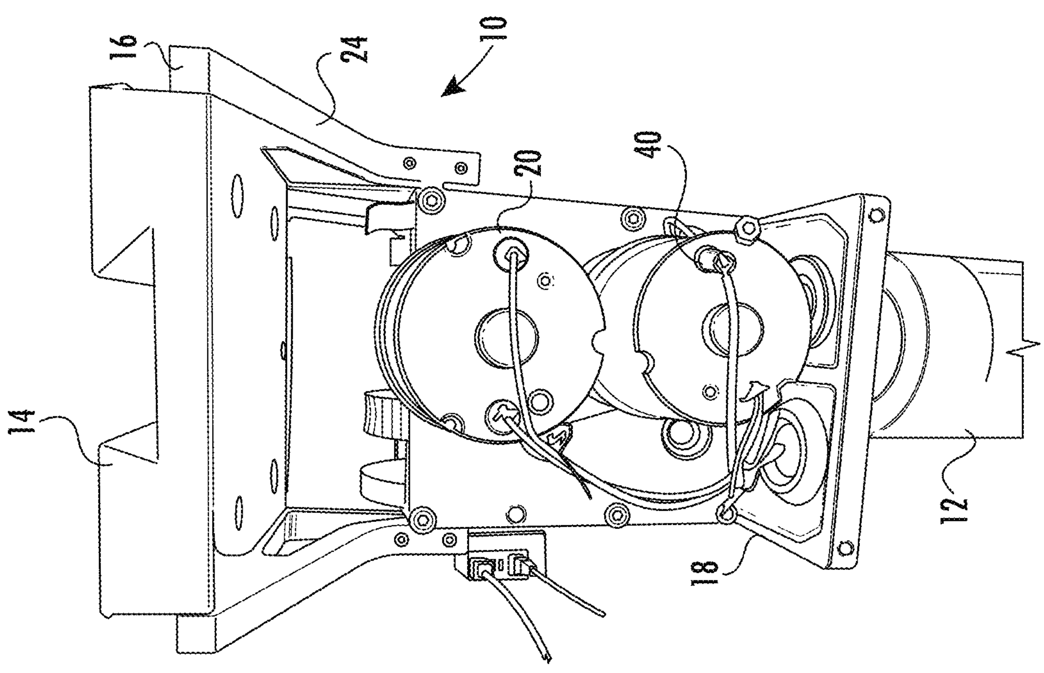
FIG. 2 is a rear view of a head mounted to an upper portion of a support according to various embodiments described herein.
Figure 1:
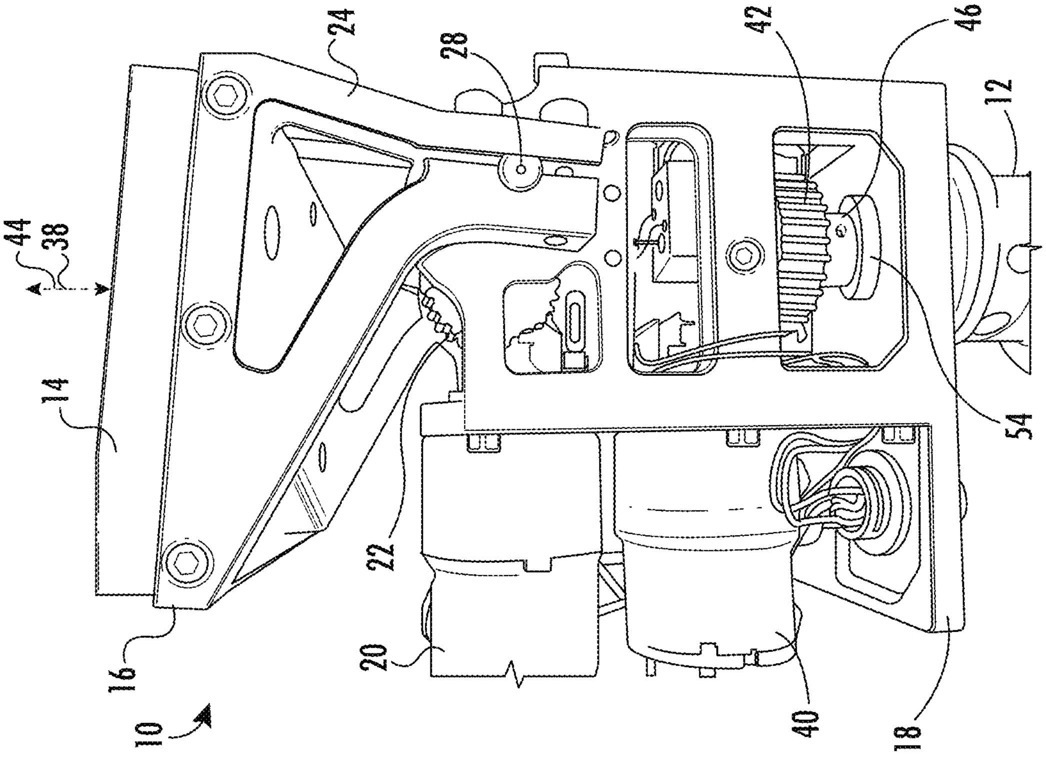
FIG. 1 is a side view of a head mounted to an upper portion of a support according to various embodiments described herein.
Figure 4:
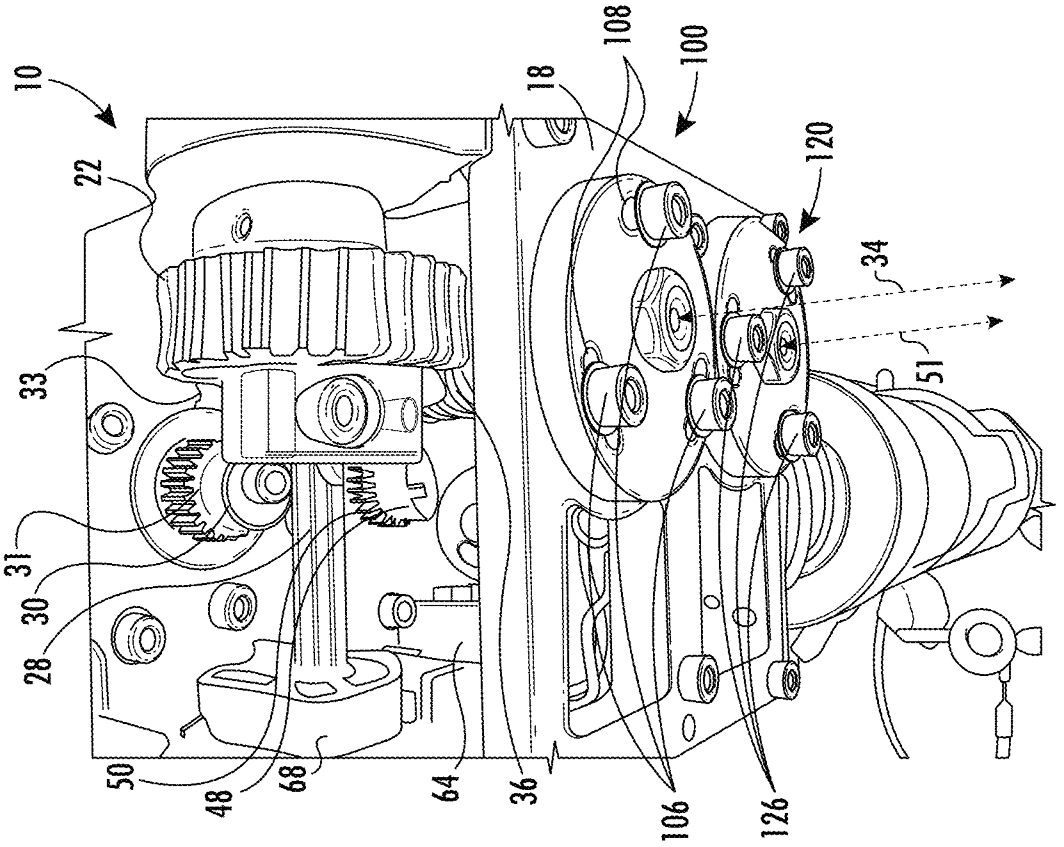
FIG. 4 is a top view of a head mounted to an upper portion of a support a tracking system according to various embodiments herein.
Figure 3:
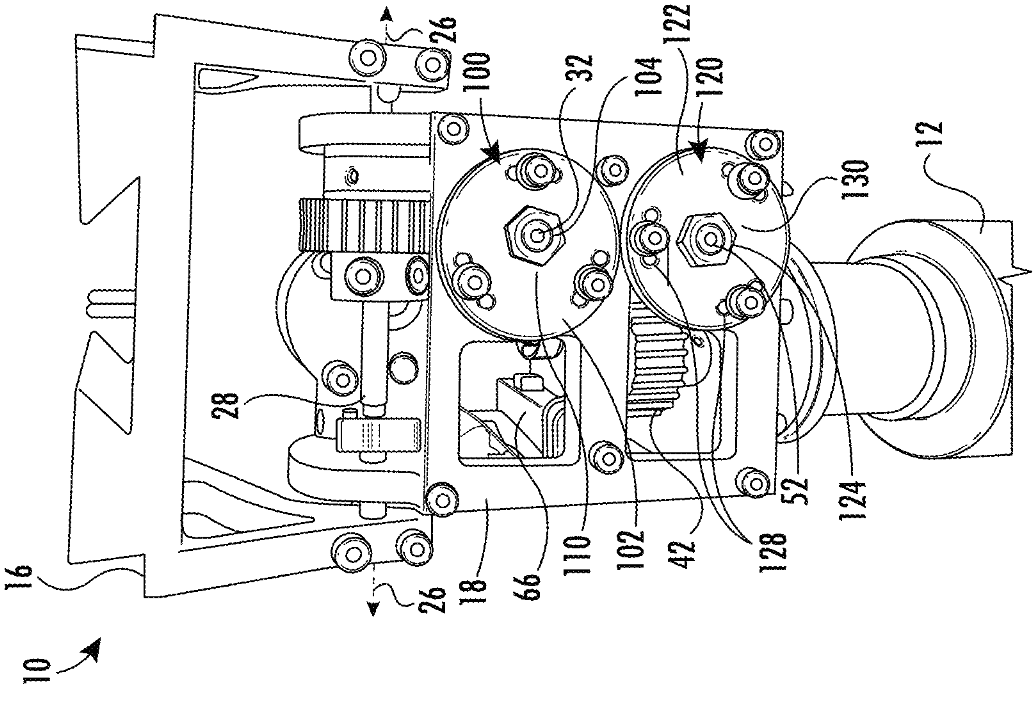
FIG. 3 is a front view of a head mounted to an upper portion of a support according to various embodiments described herein.

With particular reference to FIGS. 3 & 4, the head 10 may include a tilt shaft adjustment mechanism 100 comprising an adjustment plate 102. The tilt shaft 32 is rotatably mounted to the adjustment plate 102 by a tilt shaft bearing 104. Adjustment locks 106 are provided that extend through adjustment slots 108 in the adjustment plate 108 and fix to the frame 18. The adjustment slots 108 define arcuate openings having a common center point 110 to lie upon a generally circumferential path. The length of the adjustment slots 108 may be chosen in consideration of the worm and worm wheel design and desired degree of adjustable meshing. In the illustrated embodiment, the adjustments slots 108 extend along approximately 45° arcs to provide 45° of available rotation. The tilt shaft 32 is mounted to the adjustment plate 102 at a position bounded by the adjustment slots 108 and offset from the center point 110. The location of the tilt shaft 32 may be adjusted by loosening the adjustment locks 106 and rotating the adjustment plate 102 to move the tilt shaft 32 along an adjustment arc having a radius corresponding to the center offset distance of the tilt shaft 32 and a length corresponding to the available rotation. For example, the illustrated adjustment plate 102 has been orientated such that the tilt shaft 32 is offset to a lateral, right, side of the center point 110 to provide a movement range along the adjustment arc of approximately 45° from horizontal. Thus, a clockwise rotation of the adjustment plate 102 moves the tilt shaft 32 downwardly to the left along the adjustment arc and a counterclockwise rotation of the adjustment plate 102 moves the tilt shaft 32 upwardly to the left along the arc. When the tilt shaft 32 is adjusted to achieve the desired degree of mesh between the tilt drive gear 36 and the tilt gear 22, the adjustment locks 106 may be tightened to compress against the adjustment plate 102 within the adjustment slots 108 to lock the location of the tilt shaft 32. The location of the adjustment arc may be modified by remounting the adjustment plate 102 in another orientation, modifying the mounting location of the tilt shaft 32, or combination thereof.

The rear or motor side of the tilt shaft 32 may mount to the frame 18 via a spherical bearing to allow rotation and adjustment of the tilt shaft 32 at the forward or adjustment plate side of the tilt shaft 32. In another embodiment, the rear side of the tilt shaft 32 may comprise an adjustment mechanism similar to that described herein with respect to the forward side. In any of the above or another embodiment, the location of the tilt shaft drive gear 31 may be independently adjusted to reduce backlash with the tilt shaft gear 33. For example, the position of the tilt motor 20 may be adjusted within a range provided by adjustment slots into which the tilt motor 20 mounts to the frame 18 by loosening one or more adjustment bolt that pass through the one or more adjustment slots to mount the tilt motor 20 to the frame 18, adjusting the location of the tilt motor 40 and tilt shaft drive gear 31 coupled to the output shaft 30 thereof, and tightening the one or more adjustment bolts at the desired location within the one or more adjustment slots to secure the adjusted position of the tilt shaft drive gear 31.

In some embodiments, the head 10 may additionally or alternatively include a pan shaft adjustment mechanism 120. The pan shaft adjustment mechanism 120 may be similar to that described above with respect to the tilt shaft 32 adjustment mechanism 100. In the illustrated embodiment, the pan shaft 52 is rotatably mounted to an adjustment plate 122 via a pan shaft bearing 124. Adjustment locks 126 are provided that extend through adjustment slots 128 in the adjustment plate 122 and fix to the frame 18. The adjustment slots 128 define arcuate openings having a common center point 130. The length of the adjustment slots 128 may be chosen as described above to achieve the desired degree of adjustable meshing. In the illustrated embodiment, the adjustments slots 128 extend along approximately 45° arcs to provide 45° of available rotation. The pan shaft 52 is mounted to the adjustment plate 122 at a position bounded by the adjustment slots 128 and offset from the center point 130. The location of the pan shaft 52 may be adjusted by loosening the adjustment locks 126 and rotating the adjustment plate 122 to move the shaft along an adjustment arc having a radius corresponding to the center offset distance of the pan shaft 52 and length corresponding to the available rotation. For example, the illustrated adjustment plate 122 has been mounted such that the pan shaft 52 is offset to a vertical side, upper, of the center point 130 to provide a movement range along the adjustment arc of approximately 45° from vertical, upper. Thus, rotation of the adjustment plate 122 clockwise moves the pan shaft 52 downwardly to the right along the adjustment arc and rotating the adjustment plate 122 counterclockwise moves the pan shaft 52 downwardly to the left along the arc. When the pan shaft 52 is adjusted to achieve the desired degree of mesh between the pan drive gear 53 and the pan gear 42, the adjustment locks 126 may be tightened to compress against the adjustment plate 122 within the adjustment slots 128 to lock the location of the pan shaft 52. The location of the adjustment arc may be modified by remounting the adjustment plate 122 in another orientation, modifying the mounting location of the pan shaft 52, or combination thereof.

The rear or motor side of the pan shaft 52 may mount to the frame 18 via a spherical bearing to allow rotation and adjustment of the pan shaft 52 at the forward or adjustment plate side. In another embodiment, the rear side of the pan shaft 52 may comprise an adjustment mechanism similar to that described with respect to the forward side of the pan shaft 52. In any of the above or another embodiment, the location of the pan shaft drive gear 50 may be independently adjusted to reduce backlash with the pan shaft gear 56. For example, the position of the pan motor 40 may be adjusted within a range provided by adjustment slots into which the pan motor 40 mounts to the frame 18 by loosening one or more adjustment bolts that pass through the one or more adjustment slots to mount the pan motor 40 to the frame 18, adjusting the location of the pan motor 40 and pan shaft drive gear 50 coupled to the output shaft 48 thereof, and tightening the one or more adjustment bolts at the desired location within the one or more adjustment slots to secure the adjusted position of the pan shaft drive gear 50.

In another embodiment, an adjustment plate having adjustment slots extending along linear paths may be used to allow the tilt shaft 32 or pan shaft 52 to be adjusted along a linear path lying on a tangent or secant to the tilt gear 22 or pan gear 42 or directed to the center of the tilt gear 22 or pan gear 42. In another embodiment, the tilt shaft 32 or pan shaft 52 may be adjusted by adjusting the linear location of the shaft in the axial direction.

As introduced above, the top plate 16 includes a mounting surface 14 for mounting a device to the head 10. With particular reference to FIGS. 10 & 11, the mounting surface 14 may be integral to or be configured to mount to the top plate 16. In the illustrated embodiment, the mounting surface 14 includes upper mounting surfaces 140*a*, 140*b* having a slot 142 extending between the upper mounting surfaces 140*a*, 140*b* for slotting a device mount 144 (see FIG. 12) onto the mounting surface 14. The slot 142 is defined by a slot base 146 and slot sidewalls 148*a*, 148*b*. In some embodiments, the slot base comprises a lower mounting surface 150. The slot sidewalls 148*a*, 148*b* are angled to provide side grooves 152*a*, 152*b*. A lateral extent of the side grooves 152*a*, 152*b* is increased along a lower portion of the side grooves relative to an upper portion to provide an overhang. The overhang forms a vertically limiting portion 154*a/b* of the mounding surface to restrict vertical movement of a device mount 144 having lateral portions that position below the overhang when slotted within the slot 142. As described in more detail below, in the illustrated embodiment, the slot 142 has a dovetail cross-section that may provide an interlocking joint, e.g., dovetail joint, with a compatibly dimensioned device mount 144.

The mounting surface 14 may optionally include one or more positioning members 160. Positioning members may be configured to engage a portion of a device mount 144 to aid in positioning, e.g., maintaining a position, of the device mount 144. As shown, the mounting surface 14 includes a positioning member 160 comprising a slide stop 162 that extends from the slot base 146. The slide stop 162 is configured to engage a device mount 144 to limit a longitudinal position of the device mount 144 within the slot 142. In some embodiments, the slide stop 162 may comprise a fitting to secure a device mount 144. For example, the slide stop 162 may include a fitting configured to engage or mate with the device mount 144 or attach to another fitting that secures the device mount 144 relative to the slide stop 162. In one configuration, the slide stop 162 may be configured to be vertically translatable such that it may be selectively lowered to receive the device mount 144 within the slot and subsequently raised to insert within a slot positioned along the lower side of the device mount 144.

The mounting surface 14 may additionally or alternatively include positioning members 160 structured to compress against or insert within the device mount 144. The positioning members may be downwardly compressible to the plane of the mounting surface 14 to allow slotting of the device mount 144 and thereafter extendable, e.g., biased, upward above the plane of the mounting surface 14. In one example, the positioning members 160 comprise bias structures 164 having exposed arcuate surfaces that may be compressed downwardly to the plane of the upper mounting surface and return to a position above the plane of the upper mounting surface. As illustrated in FIG. 14, the bias structures comprise exposed spherical surfaces 166 biased by springs 168 to protrude above the mounting surface 14 and that are compressible to the plane of the mounting surface 14 or below.

With reference to FIGS. 12 & 13, a device mount 144 configured for mounting to the mounting surface 14 may include a base 170 configured to slot within the slot 142 of the mounting surface 14. The base 170 may be dimensioned to extend below the vertically limiting portion 154*a*, 154*b* of the slot sidewalls 148*a*, 148*b* as to vertically restrict the movement of the device mount 144. The base 170 may have a cross-section that corresponds to the slot 142 to provide a close fit to limit movement within the slot 142. As shown, the base 170 has angled sidewalls 172*a*, 172*b* and a dovetail cross-section corresponding to that of the slot 142.

The base 170 may also include a positioning member 160 comprising a slide stop slot 174 for receiving the slide stop 162. In the embodiment illustrated in FIG. 12, the slide stop slot 174 is dimensioned to receive the slide stop 162 to limit longitudinal movement beyond the slide stop 162. In the embodiment illustrated in FIG. 13, the slide stop slot 174 is similarly dimensioned to receive the slide stop 162 but also includes a fitting 176 for locking the longitudinal position of the base 142 relative to the slide stop 162. The fitting 176 comprises a hole positioned above the slide stop slot 174 for receiving a stop pin (not shown). The stop pin may be inserted within an opening 178 in the slide stop 162 to lock the longitudinal position of the device mount 144. The embodiment show in FIG. 13 also illustrates a reverse mount feature that may be included in various embodiments to enable mounting the device mount 144 in the reverse direction. Specifically, slide stop slots 174 are provided at both longitudinal ends of the base 170 of the device mount 144.

In some embodiments, device mounts 144 may include one or more lateral extensions 180*a*, 180*b* that extend laterally relative to the base 170 to provide additional stability. For example, in the illustrated embodiments, lateral extensions 180*a*, 180*b* are provided on both sides of the base 170. The lateral extensions 180*a*, 180*b* are positioned relative to the base 170 such that they position over the upper mounting surfaces 140*a*, 140*b*. A lower surface 182*a*, 182*b* of the lateral extensions 180*a*, 180*b* may slide on top of or otherwise provide a close fit with upper mounting surfaces 140*a*, 140*b* to limit roll movement when mounted to the mounting surface 14. In the illustrated embodiments, one or more positioning members 160 comprising a slot 184 are provided in the lower surface 182*a*, 182*b*. As shown, multiple slots 184 are positioned and dimensioned to receive the spherical surfaces 166 of the bias structures to further limit movement of the device mount 144.

FIG. 14 depicts longitudinal cross-sections taken along the upper mounting surface 140*a* of the mounting surface 14 and lateral extension 180*a* of device mount 144 to illustrate mounting a device mount 144 to a mounting surface 14. The base 170 of the device mount 144 may be slotted through the slot 142 (see FIG. 10) of the mounting surface 14. As the lower surface 182*a* of the lateral extension 180*a* passes over the bias structures 164, the spherical surfaces 166 are pushed downwardly on the springs 168 until the slots 184 in the lower surface 182 of the lateral extension 182 position over the spherical surfaces 166 to allow the bias to position the spherical surface within the slots 184. In the illustrated embodiment, the spherical surfaces are configured to compress against walls of the slots 184. However, in other embodiments, the spherical surfaces may be biased to position within the slots 184 without compressing against walls of the slots 184. In some embodiments, a slide stop 162 may also be provided that slots into a slide stop slot as described above. In a further embodiment, the slide stop 162 may be locked with the slide stop slot 174 as also described above, e.g., using a slide stop pin.

It is to be appreciated that the locations of positioning members 160 may be reversed with respect to the mounting surface 14 and device mount 144 as well as location on the mounting surface 14 and device mount 144. Positioning members 160 may additionally or alternatively be located at other positions along the mounting surface 14 and device mount 144.

This disclosure describes various elements, features, aspects, and advantages of various embodiments of a head for mounting a device to a support and methods of use. While the head is described with respect to mounting sensors for tracking objects during a golf tournament, the head may find use in other applications, such as mounting sensors or other devices to track objects or capture aspects of a surrounding environment in other golf, non-golf related, sport related, or non-sport related applications. It is to be understood that certain descriptions of the various embodiments have been simplified to illustrate only those elements, features and aspects that are relevant to a clearer understanding of the disclosed embodiments, while eliminating, for purposes of brevity or clarity, other elements, features and aspects. It is to be understood that while this description may use directional or relative positional language system components may be used in multiple orientations, and such directional or relative positional language has been used to assist the reader in understanding the features and operations of the invention described herein and is not intended to be limiting.

The illustrations of arrangements described herein are intended to provide a general understanding of the structure of various embodiments, and they are not intended to serve as a complete description of all the elements and features that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

Any references to "various embodiments," "certain embodiments," "some embodiments," "one embodiment," "an embodiment," or their "example," "configuration, or "instance" counterparts generally means that a particular element, feature and/or aspect described is included in at least one embodiment, but may not refer to the same embodiment. Furthermore, the phrases "in one such embodiment" or "in certain such embodiments," while generally referring to and elaborating upon a preceding embodiment, are not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

It is to be appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein and are not necessary for a complete understanding of the disclosed embodiments, a description of such elements, features, and aspects may not be provided. As such, it is to be understood that the description set forth herein is merely exemplary and illustrative of the disclosed embodiments and is not intended to limit the scope of the invention as defined solely by the claims.

The invention claimed is:

1. A mounting surface provided on or configured to be associated with a top plate of a head for mounting a sensor device to track objects on a golf course during a golf tournament, the mounting surface comprising:

an upper mounting surface;

a slot extending through the upper mounting surface and defined by a base and sidewalls that extend from the base and that further define side grooves along lateral sides of the slot, wherein a lateral extent of the side grooves is increased along a lower portion of the side grooves relative to an upper portion of the side grooves to provide a vertically limiting overhang portion that restricts vertical movement of a device mount of a mounting device having lateral portions that position below the vertically limiting overhang portion when slotted within the slot; and one or more positioning members configured to engage a portion of a device mount of a sensor device to aid in positioning the device mount relative to the mounting surface, wherein at least one of the one or more positioning members is located along the upper mounting surface and is provided with a vertical bias to position a surface thereof above a plane of the upper mounting surface, the surface being vertically displaceable downward against the vertical bias.

2. The mounting surface of claim 1, wherein the sidewalls are inwardly angled from the base such that the side grooves together with the base define dovetail slot for receiving a complementary dovetail shaped device mount of a sensor device to form a dovetail joint.

3. The mounting surface of claim 1, wherein the one or more positioning members further comprise a slide stop that extends from the base of the slot and that is configured to engage the device mount of the sensor device to limit a longitudinal position of the device mount within the slot.

4. The mounting surface of claim 3, wherein the slide stop comprises a fitting configured to engage or mate with the device mount or attach to another fitting that secures the device mount relative to the slide stop.

5. The mounting surface of claim 3, wherein the slide stop is vertically translatable such that it may be selectively lowered to receive the device mount within the slot and subsequently raised to insert within a slot positioned along a lower side of the device mount.

6. The mounting surface of claim 1, wherein, in use, the surface the surface of the at least one of the one or more positioning members is configured to be vertically displaceable downward against the vertical bias by an interfacing surface of the device mount as the device mount is translated through the slot of the mounting surface and along the upper mounting surface.

7. The mounting surface of claim 6, wherein the surface of the at least one of the one or more positioning members comprises an arcuate surface.

8. The mounting surface of claim 7, wherein the at least one of the one or more positioning members comprises a sphere having the arcuate surface.

9. The mounting surface of claim 8, wherein the at least one of the one or more positioning members further comprises a spring that vertically biases the sphere.

10. The mounting surface of claim 9, wherein the spring is positioned below the sphere.

11. The mounting surface of claim 6, wherein the surface of the at least one of the one or more positioning members is displaceable downwardly to at least the plane of the upper mounting surface.

12. The mounting surface of claim 1, wherein the at least one of the one or more positioning members comprises a spring positioned below the surface of the at least one of the one or more positioning members to provide the vertical bias.

13. The mounting surface of claim 1, wherein the surface of the at least one of the one or more positioning members is vertically displaceable downward to at least the plane of the upper mounting surface.

14. The mounting surface of claim 1, wherein the at least one of the one or more positioning members comprises: a sphere having the surface; and a spring positioned below the sphere to provide the vertical bias.

15. The mounting surface of claim 1, wherein, in use, the surface of the at least one of the one or more positioning members is configured to be vertically displaceable downward against the vertical bias by an interfacing surface of the device mount as the device mount is translated through the slot of the mounting surface and along the upper mounting surface and thereafter be displaced upward by the vertical bias to position within a device mount slot defined along the interfacing surface when the device mount slot positions over the surface of the at least one of the one or more positioning members.

* * * * *